2,706,183
Patented Apr. 12, 1955

2,706,183

METHOD OF PRODUCING A RESILIENT CELLULAR RUBBER

Mitchell Carter, Yardley, Pa.

No Drawing. Application December 20, 1949,
Serial No. 134,148

1 Claim. (Cl. 260—2.5)

This invention relates to the treatment of rubber latex and, more particularly, to the production of foamed-latex sponge. It includes new products.

Any conventional foamed latex sponge products may be produced according to this invention, as for example, mattresses, cushions, slabs, carpet underlay, shoulder pads, artificial breasts, toys, etc. Heavily compounded sponges may be produced. Various substances may be incorporated directly into the latex foam in their dry state. Substantial quantities of oil may be incorporated into the latex foam without first being made into a water emulsion. Various dry substances may be dispersed into oil and this dispersion incorporated into the latex foam. All of the above may be accomplished without adding conventional foaming agents or gelling agents, and a sponge so produced. Oleic acid may be used to assist in accomplishing all of the above. I have discovered that oleic acid serves as a foaming agent, protective colloid, foam-sustaining agent, and as a gelling agent under heat-treatment. According to this invention products with superior tensile, indentation, cellular structure, abrasive resistance, etc. are produced.

A very small amount of oleic acid gives desirable properties to a natural rubber latex. On foaming and curing, a sponge of greatly improved tensile is produced. The oleic acid serves as a foam-sustaining agent and may be used either with or without a foaming or gelling agent or both. The air cells in such a sponge are spherical and give the sponge a greater indentation value than those having the recticular or frothy structure obtained by the prior art. (By "indentation" as that term is used herein is meant the load required to compress a sponge rubber twenty-five per cent of its original height between parallel plates. The determinations referred to herein were made as prescribed in A. S. T. M. Standards on Rubber Products published by American Society for Testing Material, Philadelphia, Pa., February 1948, pages 406–407.)

According to this invention inert powdered fillers such as flint, whiting, etc. are added in a dry state directly to foamed latex and dispersed therein with subsequent curing of the foam for the production of sponge. Other solid filler such as sawdust or wood flour (preferably from non-acid woods), as well as fillers such as flint, whiting, etc. may be dispersed in a dry state in oil which is later incorporated in foamed latex for the production of sponge.

Although the new methods and products disclosed herein relate more particularly to the production of products from natural rubber, it will be apparent that synthetic rubber latices may be employed to the extent that oil is soluble in them. Blends which may include both natural and synthetic latices may be used. Thus, latices of GR-S, etc. may have oil incorporated in them after foaming. Certain rubbers, such as the nitrile rubbers, are ordinarily considered oil-resistant and for such rubbers petroleum or other insoluble oils are unsatisfactory, but to the extent that oils may be incorporated into any rubber latex (natural or synthetic) and dissolved into the rubber thereof with ultimate production of a sponge, the invention includes all rubbers and oils soluble therein, particularly when the oil is cheap and used in sufficient quantity to cheapen the rubber.

According to this invention oil, preferably a petroleum oil, is embodied in foamed-latex sponge. There is no prior art on the use of as much as twenty-five or fifty or more parts of oil per one hundred parts of rubber in a foamed-latex sponge and sponges containing this amount of oil are new. There is no prior art on adding unemulsified oil in any amount to latex as contemplated by this invention and these processes are claimed as new. There is no prior art on adding oil in any amount to a foamed latex as contemplated by this invention. The sponge may contain as much as several hundred per cent of oil by weight (based on the weight of the rubber). The use of oil in sponge materially reduces the cost of the sponge. Furthermore, the incorporation of oil in the sponge improves the properties of the sponge as will be explained hereinafter.

In a preferred method of producing sponge according to this invention, sufficient oil is dissolved into the rubber particles of a concentrated latex to cause the latex foam to set without the aid of a gelling agent. Oleic acid is used to facilitate incorporation of the oil in the latex. Although animal and vegetable oils may contain sufficient oleic acid for this purpose, petroleum oils contain no oleic acid and according to the invention oleic acid is added to such an oil or to the latex to facilitate incorporation of the oil into the latex. By using no more than several parts of oleic acid per 100 parts of the rubber present in natural rubber latex, as much as several hundred parts by weight of petroleum oil (based on the weight of the rubber) can be incorporated in foamed latex which is stirred to maintain the foam. Curing ingredients are then added and the foam is poured into a mold and cured to produce a cheap sponge the properties of which are capable of variation depending upon the use to which the sponge is to be put.

This application is a continuation-in-part of my application Serial No. 85,521 filed April 5, 1949, now Patent No. 2,680,140.

MECHANICAL STABILITY

As I propose to make many references to mechanical stability in describing my invention, it seems desirable that it be thoroughly discussed before proceeding with the specification.

There are few, if any, substances used in industry that are subject to as many pertinent variations as natural rubber latex, and there is nothing else that I know of which is manufactured from latex in which the chemical and physical conditions and all processing procedures are as exacting or as critical as in making foamed-latex sponges.

I have found that in sponge manufacture, if the optimum mechanical stability is kept substantially uniform, for a given operation, most variations in the other properties of the latex may be disregarded. By mechanical stability I mean: The time of agitation required to cause a latex to reach solidity under certain conditions which will be set forth below. In the past considerable attention has been directed to changes in the hydrogen-ion concentration of the latex. This does not necessarily control the mechanical stability. Many things affect the mechanical stability and other properties of latex, such as the season in which the latex is taken from the tree, the species of the tree, the age of the latex, all conditions under which it is transported, the temperature at which it is stored, and the variations of temperature to which it is subjected, agitation of any kind, and the presence or absence of substances (liquids or solids) in the latex even though they be of the same pH as the latex.

Over a period of many years the latex I have purchased on the open market from various standard sources of supply has shown mechanical stabilities of from 90 to 400 seconds with a wide variation in total solids, pH, viscosity, ammonia content, surface tension, K. O. H., etc. If one of these latices is satisfactory in a particular formula others may not be at all satisfactory. For example, if the latex used in a mix has a stability of, say, 150 seconds, latices with a stability of, say, 125 and 175 seconds respectively, may be unsatisfactory or a failure. Some latices have a mechanical stability so high or so low that they are unsuitable for the production of sponge. These may be blended to give the optimum stability for a given formula.

The mechanical stability of any latex mix affects the galling time. The lower the mechanical stability the faster the mix will gel, whether or not a gelling agent is used in the mix. Agitation or stirring of the mix lowers the stability. Almost any substance added to latex that reduces the water content of the mix reduces its stability and consequently its gelling time. One notable exception to this is oleic acid, which, as I shall show, both raises the mechanical stability and yet reduces the gelling time under heat treatment.

Latex will coagulate if subjected to sufficient mechanical agitation. The lower its mechanical stability the quicker it will coagulate or gel. Regardless of the pH of the latex, the lower its water content or the greater its total solids, the more rapidly it will gel under all conditions.

I have discovered that a foam made from ammoniated latex in conjunction with the necessary curing ingredients, when whipped sufficiently long to reduce the mechanical stability to a certain desired point may be spread or cast into molds, gelled and vulcanized, thereby producing useful articles. Fillers such as oil and dry powders may be incorporated in many latices of a reasonably high mechanical stability without first being made into an aqueous dispersion, and the resulting compounded latices may be foamed, gelled and cured to produce satisfactory articles of foamed-latex sponge. These processes may be carried out without the addition to the latex of either a foaming or gelling agent.

For the purpose of this specification mechanical stability is to be determined as follows: The top blade and bottom nut are removed from an Oster soda fountain mixer leaving a single blade 1 inch in diameter and 5/8 inch above the bottom of the shaft. A vessel 1½ inches square and 3½ inches high is used. The wall is shaped from 26-gauge stainless steel. The bottom is a sheet of the steel 2½ inches square. The wall is soldered to it on the outside so as to retain a perfectly smooth inner surface. Fifty cubic centimeters of a latex which has been stored 24 hours at 70° F. are put in the vessel which has been standing in a room maintained at 70° F. The determination is made at this room temperature. The mixer is started and when operating at 17,000 R. P. M. the mixing shaft is centered in the vessel with the bottom of the shaft 3/8 inches above the bottom of the vessel. No water bath is used and during the test the temperature of the latex will rise. The friction of stirring causes the latex to become semisolid and revolve with the mixer blade, simultaneously breaking away from the corners of the vessel, leaving air voids in the corners. At the beginning of this treatment the volume of the latex increases and then gradually decreases until such coagulation takes place. The measure of mechanical stability is the time of agitation required to cause the latex to become sufficiently solid to revolve with the mixer blade and break away from the corners of the vessel.

To illustrate various influences affecting mechanical stability, a certain latex with a mechanical stability of 150 seconds, was divided into several parts. Each part was treated differently by mixing another ingredient with it or subjecting it to temperature changes, and the change in mechanical stability was noted and is recorded below:

| Mechanical stabilities | Seconds |
|---|---|
| Latex | 150 |
| 50 gm. latex plus 2 drops oleic acid | 264 |
| 50 gm. latex plus 2 drops 50% ammonium nitrate | 112 |
| 50 gm. latex plus 2 drops green soap | 218 |
| 50 gm. latex plus 2 drops 25% Darvan solution | 176 |
| 50 gm. latex plus 5 cc. water | 230 |
| 50 gm. latex plus 5 cc. 25% ammonia | 270 |
| 50 gm latex plus 5 grams dispersed curing ingredients MBAB | 55 |
| Same as preceding with 2 drops oleic acid added | 188 |
| Laetx cooled to 33° F., then re-heated to 70° F | 105 |
| Latex heated to 100° F | 80 |

When latex is at rest the lighter substances gradually rise to the top as cream rises in milk. Therefore, before testing for mechanical stability or before using a part of a drum or other container for production, it is desirable to stir its contents by any suitable means or to turn the drum or other container on rollers as is customary in the use of ball mills to make the contents of the drum or container uniform; and in order not to materially change the mechanical stability of the latex this stirring or turning must be done slowly. Closed vessels should be used so as to prevent the escape of the ammonia. Twenty-four hours of such slow mixing is recommended to insure proper blending. The temperature of the latex should be maintained at that of the production operation.

FOAM INDEX

In foaming latex it reaches a certain maximum volume, and this cannot be increased by additional whipping. Under the same conditions two latices have the same foam index if they foam to the same maximum volume in the same length of time under the same foaming conditions.

To determine the foam index any size of container and whipping equipment may be used. Before testing, distilled water should be added to the latex if and as necessary, to bring it to the total solids content at which it is going to be used. In comparing two latices, if, for example, one makes 2800 cc. of foam in 200 seconds and the other makes 3000 cc. of foam in the same time, they do not have the same foam index. Likewise, if both reach the same maximum foam volume of, for instance, 3000 cc., but it takes only 150 seconds to produce this maximum volume with one latex and requires 200 seconds for the other to produce this maximum volume, they do not have the same foam index. If the difference in the foam indices of two latices is sufficiently great, one will not be suitable for use in a foaming operation in which the other is entirely satisfactory.

Generally the foam index is directly related to the mechanical stability, so that the greater the stability the more rapidly foam may be produced and the greater its maximum volume. However, in some latices this does not hold true. It is therefore a wise precaution to test both the mechanical stability and the foam index of any latex before using it in the production of foam. The mechanical stability and the foam index may be brought to the optimum for any given operation with a small amount of oleic acid.

CREAMED LATEX

Creamed latices generally have a much higher mechanical stability than centrifuged latices, due to the creaming agent remaining in them. Generally they are not as satisfactory as the centrifuged latices for the production of sponge because they give a more frothy or disconnected structure. However, creamed latices to which only a small amount of creaming agent has been added, may be used.

OLEIC ACID AS A FOAM-SUSTAINING AGENT

Natural latex of the high solids content customarily used in industry, when foamed mechanically according to any of the prior art methods coagulates if the foaming operation is continued a sufficiently long time. When the curing agents are mixed with the foamed latex the mix does not persist but breaks down on standing or when heated to cure.

To overcome this breaking down, a foaming agent and a gelling agent, or sometimes only a gelling agent is incorporated in natural rubber latex before or during mixing. The usual foaming agents are soaps, licorice, glue, casein, saponin, egg albumen, etc. The usual gelling agents include ammonium nitrate, ammonium sulfate, sodium silico fluoride, etc. When a gelling agent is used, the latex mix of the prior art must be quickly molded. Otherwise it will set up in the mixer. The time of molding is so critical that the use of gelling agents presents various disadvantages in commercial operations.

It is believed that the foaming agents usually employed form a coating on the individual rubber particles in the latex, and their presence at the surface of the particles reduces the strength of the bond formed between the rubber particles when vulcanized. However this may be, the fact is that by omitting both the foaming and gelling agents, and using a small amount of oleic acid as a foam-sustaining agent to preserve the cell structure of the mix before and during vulcanization, sponge of high tensile strength is produced. When a foaming agent is used it forms a film over the surface of the individual rubber particles which persists after vulcanization giving a non-homogeneous product which has a lower tensile than a product in which no foaming agent has been used. When oleic acid is used it is eventually absorbed into the rubber particles and becomes an integral part thereof. It leaves no film on the particles and does not adversely affect the bonding of the rubber particles.

The production of foam using oleic acid as a foam-sustaining agent may be controlled to obtain a sponge of much lighter gravity than that produced from latex foamed by the usual processes. Furthermore, the whipping or other treatment of this latex to form or maintain a smooth, uniform foam may be continued several hours at reduced speeds after all ingredients have been incorporated, without fear of the foam setting in the mixer. Likewise, if the foaming operation is continued for about 10 minutes or longer after all the curing ingredients, etc. are incorporated in it and then discontinued, the mix will stand indefinitely without settling out or loss of volume. Yet the gelling time, after the mix is cast or spread and subjected to the gelling temperature, is satisfactory for commercial production.

Although in the prior art there is reference to the use of oleic acid and compounds of oleic acid, such as ammonium oleate, in latex, I believe that no one has used oleic acid or ammonium oleate in the manner in which they are used according to this invention, nor has there heretofore been shown the results obtained according to this invention.

I have not only found that oleic acid serves as a foam-sustaining agent, but I have also discovered that by the addition of a small amount of oleic acid to the latex, preferably at the beginning of the foaming operation, the foam will reach a much greater volume than when no oleic acid is used. Furthermore, in all cases in which oleic acid is used the mixing may be continued a much longer time, enabling a much more thorough mixing of the various curing and compounding ingredients. The mixes will be much more uniform and much smoother. Yet, the gelling time, after the mix is cast or spread and subjected to the gelling temperature, will be much shorter than if no oleic acid is used, and the cellular structure and all end points of the product will be quite superior to that where no oleic acid is used.

Where oleic acid is used in the mix without a gelling agent the cell size may be maintained over a very long time by slowly stirring the mix. There is no danger of the mix gelling in the mixing equipment. Therefore the process lends itself to a conventional continuous foaming and mixing operation, even where a large number of small molds is used. Such large scale operations are very difficult to carry out where a gelling agent is used in the mix, because of the danger of premature gellation. Using oleic acid as a foam-sustaining agent there is no gelling in the mixer and no cleaning is necessary until the mix is discontinued or a different formula is employed.

It is well known that most all natural rubber latex contains a small amount of oleic acid and traces of linoleic, stearic acid, etc. I have discovered that when two different latices have substantially all other properties the same except the difference in oleic acid content, a greater volume of foam may be obtained with a given foaming operation with the latex containing the greater percentage of oleic acid, and that a given volume of foam may be obtained in a shorter length of time. This also holds true when oleic acid is added to the latex before or during foaming.

The mechanical stability increases with the increase of oleic acid. And while oleic acid acts as a foam stabilizing or sustaining agent or a protective colloid, unlike all other such substances it also has the function of a gelling agent under heat. Latex foam containing the optimum amount of oleic acid in conjunction with other compounding substances including the curing ingredients, will gel more rapidly under heat than latex containing no oleic acid. A gelling agent may be used in the latex mix together with the oleic acid but considerably less gelling agent will be required to produce a given degree of gel in a given length of time at a given temperature than is required when the oleic acid is not used. Therefore, when gelling agents are used with oleic acid in carrying out this invention they are used in such small amounts that no satisfactory gelling would occur if the oleic acid were not present.

Where casein, glue, licorice, the various soaps, etc. are used as a foaming agent or protective colloid, additional amounts of gelling agent must be used in proportion to the colloids so as to produce the same degree of gel under the same time and temperature.

It sometimes may be desirable to use a foaming or gelling agent or both, together with oleic acid, in carrying out this invention but, if so, in order to produce the improved results which I obtain by using oleic acid it is necessary that the foaming agent or gelling agent or both be used in such small amount that they would not materially affect foaming or gelling unless the oleic acid were present.

The prior art disclosures of the use of oleic acid in the production of foamed latex mixes are in conjunction with the use of a small amount of oil. No reasons are given for its use. In all cases where the use of oleic acid is disclosed, it is used together with both a foaming agent and a gelling agent. There is no indication that oleic acid can be used alone as a foaming agent nor that it is a foam-sustaining agent, nor a gelling agent.

In general, about 0.1 to 1.5 parts of oleic acid will be used per 100 parts of rubber in the latex, depending upon the mechanical stability of the latex. This is equivalent to 2 to 20 drops of oleic acid per 100 grams of latex (60 per cent rubber). Too much of the acid forms a sponge having a frothy or disconnected structure. If too little is used the mix will collapse into a liquid when heated, in the manner that a mix containing no oleic acid or no gelling agent collapses. The right amount of acid sustains the mix. Agitation of the mix is necessary to reduce the mechanical stability of the latex, to the optimum condition of the particular mix. It is this together with the action of the oleic acid that causes the latex to set up. Substituting any of the so-called foaming agents, such as soap, glue, casein, etc. in place of oleic acid, the mix will break down and settle out on standing or in vulcanization, and if a gelling agent is added to prevent this, the process and product are subject to the disadvantages inherent in the prior art.

It is apparent that latex of too low solids content cannot be used in carrying out my invention. It must have a solids content of preferably fifty or sixty per cent or more. The present commercial latices with a solids content of about sixty-two per cent can be used very satisfactorily. The lower the solids content of the latex, the more oleic acid required to sustain the mix.

To cure, more or less of the necessary curing ingredients, such as zinc oxide, sulfur, accelerator, antioxidant, etc. are added to the foam, and this follows common practice. Ordinarily, an aqueous preparation containing the desired percentages of the desired curing ingredients will be prepared by ball milling with a suitable dispersing agent. This ball-milled mixture is then stirred into the latex preferably after the foam has been brought to the desired volume.

The invention contemplates only the production of resilient sponge. Consequently only a limited amount of sulfur is employed, usually about 1 to 2 per cent based on the weight of the rubber. The minimum amount of sulfur, zinc oxide and accelerator which will produce a good cure, give the best sponge.

Any accelerator employed in the production of latex sponge rubber may be used. I have found that the product Stablex B is the best dispersing agent. It holds the various curing agents in suspension in the ball-milled masterbatch and prevents settling out better than any other recommended substances for this purpose. Its source of supply as well as that of all other chemicals used in these formulae may be found in the leading rubber trade publications. They are standard in the industry and their chemical compositions are well known to the art.

Generally a wetting agent will be employed to disperse the various curing ingredients in water. The manufacturers of the various ingredients generally recommend how dispersions may be made, and these recommendations may be followed. In general soaps are to be avoided because they reduce the tensile of the cured sponge but other dispersing agents may be used. The curing agents and compounds are preferably added to the latex after foaming, but may be added before or during foaming without fear of premature gellation. The oleic acid may be added at any stage but generally it is preferable to add it as soon as possible after the foaming operation starts. It is generally advantageous to add all of the other ingredients after the foaming is completed because many ingredients prevent the foam from reaching the desired volume, particularly in a low density foam.

In the prior art processes which employ a gelling agent, the lighter the foam the more critical the process. By using neither foaming agent nor gelling agent, but using oleic acid as a foam-sustaining agent, lighter foams are possible and foams of such low density may be prepared that satisfactory cushions and mattresses are obtained without resorting to coring the molds. To produce very light foams from concentrated latices, such as a latex of at least sixty per cent solids, it may be necessary to dilute the latex with water or ammonia. Sponges of different specific gravity are obtained, as desired.

The foam may be made with nitrogen, carbon dioxide, air, or any suitable gas. The gas may be incorporated into the foam with a beater, or it may be introduced through suitable means in the bottom of the foaming equipment, etc. Any mechanical means or process may be used for incorporating the gas into the latex to form and maintain the foam. Sponge of various cell sizes is obtained by allowing the foamed mix to stand for different lengths of time before curing, as will be shown.

The density of the sponge depends in part upon the shrinkage which takes place. This in turn depends on the conditions of cure. If the foamed mix is thoroughly dried and then cured, as by heating for 12 hours at 60° C., there is substantially no shrinkage, the shrinkage being no more than about two per cent in volume. If the same material, without prior drying, is cured 15 minutes at 30 pounds steam pressure it will shrink about ten per cent when dried. If cured in open steam the volume will shrink about five per cent when dried. Curing in a high frequency electronic field causes an initial slight increase in the volume of the mix in open top molds. (A frequency of 13.5 megacycles is recommended.) The cells communicate under the pressure of the expanding volume of gas within them, then the volume of the foamed mix shrinks to its original size. The foamed mix should not be heated too rapidly until this has taken place. After the cells communicate the foamed mix may be cured rapidly. It may be transferred to other heating means at this point.

I have made many experiments involving foamed-latex sponge in connection with this invention, substituting various substances for oleic acid which, as brought out more clearly in what follows, may be used as a foam-sustaining agent. Although ammonium oleate is the substantial equivalent of oleic acid, for this purpose, I have not found any other acid or oleate which is as satisfactory as oleic acid or ammonium oleate. The materials with which I have experimented include stearic acid, palmitic acid, linoleic acid, etc., and ammonium linoleate, aluminum oleate, amyl oleate, butyl oleate, cobalt oleate, cupric oleate, lead oleate, potassium oleate, sodium oleate and triethanolamine oleate, etc. Some of these substances are incompatible with latex and others react undesirably in other ways. None of them is as convenient to use for my purpose as oleic acid and I even prefer oleic acid to ammonium oleate. All of the aforementioned materials, except linoleic acid, must first be made into an emulsion before incorporating it with the latex or latex foam. Neither linoleic acid nor ammonium linoleate produces a latex foam as rapidly or in as great a volume as does oleic acid. Neither is as satisfactory in either the processing operation or end point of the product as oleic acid. There is nothing in any of the other substances that is necessary for the purposes of this invention or that is desirable, except the oleic acid which they contain. For the above, and other reasons stated herein, I prefer to use oleic acid.

The following example illustrates the use of oleic acid (without other foaming agent and in the absence of a gelling agent) in the production of sponges of different indentation values for the same density.

EXAMPLE 1

PRODUCTION OF SPONGES OF DIFFERENT INDENTATION VALUES

Two masterbatches of curing ingredients were prepared and using these, several identical latex mixes were produced. These were subjected to different treatments to produce sponges of different indentation values.

The masterbatches were prepared in the usual way from aqueous dispersions of their various ingredients. The formulae for these preparations follow:

Masterbatch M

| | Parts by weight |
|---|---|
| Water at 180° F. | 20 |
| Darvan No. 1 (sodium salt of polymerized alkyl-aryl sulfonic acids) | 2 |
| Du Pont Accelerator 552 | 2 |
| Sulfur | 6 |
| Zinc oxide | 9 |
| AgeRite White (di-beta-naphthyl-para-phenylenediamine) | 2 |

These ingredients were ball-milled for twenty-four hours.

Masterbatch N

| | Parts by weight |
|---|---|
| Water at 180° F. | 45.1 |
| Darvan No. 1 (sodium salt of polymerized alkyl-aryl sulfonic acids) | 2.1 |
| Caustic soda | 0.3 |
| Casein | 2.5 |
| Beta naphthol | .1 |
| Butyl zimate (zinc dibutyl dithio-carbamate) | 50.0 |

These ingredients were ball-milled for twenty-four hours.

The latex was foamed and prepared in a Hobart type A-200 twenty-quart mixer having Hobart air discs in the bottom of the mixing bowl. The No. 1 speed of the mixer was low speed, and No. 2 was medium speed. Compressed air at a very low pressure was used to force bubbles into the latex while mixing. The temperature of the room and all ingredients was 75° F.

The natural rubber latex used in this example was a centrifuged latex which had aged substantially six months. This is referred to herein as Latex No. 1. It had the following properties: Total solids, 62%; ammonia content, .5%; viscosity at 60% total solids content at 77° F., 45 cps.; surface tension at 40% total solids content, at 95° F., 40 dynes; pH, 9.5; mechanical stability at 70° F., 180 seconds; K. O. H., 7.5.

The air was turned on and entered the bottom of the bowl through the discs. Two thousand grams of the latex were put into the bowl. One hundred grams of water, 50 grams of 26% ammonia and 6 cc. of oleic acid were incorporated in the latex while stirring at No. 1 speed until the foam while at rest and with the air turned off was 4 inches from the top of the bowl. This took about four minutes. Then while stirring at No. 2 speed, 200 grams of Masterbatch M and 20 grams of Masterbatch N were added. Stirring was continued for five minutes at No. 2 speed and then at No. 1 speed for ten minutes. The foam was poured into an open-top 16-gauge aluminum mold (without pins) measuring 13½ x 13½ x 4½ inches.

Several identical batches were prepared in this way, and each was subjected to a different subsequent treatment and then vulcanized in open steam at 212° F., as follows:

Batch A—The mix was placed in the vulcanizer immediately after putting into the mold.
Batch B—The mix was allowed to stand in the mold fifteen minutes before placing in the vulcanizer.
Batch C—The mix was allowed to stand in the mold thirty minutes before placing in the vulcanizer.
Batch D—The mix was allowed to stand in the mold sixty minutes before placing in the vulcanizer.
Batch E—Several mixes were allowed to stand in the mold various lengths of time from six hours up to six days before vulcanizing.

The following table records the character of the cured sponge:

| Batch | Cell Size, mm. | Indentation, p. s. i. |
|---|---|---|
| A | 0.5 | 0.42 |
| B | 1.0 | 0.47 |
| C | 2.0 | 0.55 |
| D | 4.0 | 0.60 |

In all of the E mixes the cell size and indentation were substantially the same as for D mix.

The table shows that the cell size and resultant increase in cellular wall thickness materially affect the indentation. All of the above pieces of sponge had substantially the same weight and volume (within tolerance limits).

The indicated mixing times and speeds are the minimum optimum with this equipment for this formula. Any substantial reduction in the mixing time gave an unsatisfactory sponge. However, the mixing time has been increased up to two hours at No. 1 speed without any noticeable change in the foamed mix, and batches so mixed could then be poured and vulcanized with the results indicated in the above table.

Compared to foamed-latex sponges produced by other processes, the sponges made using oleic acid as a foam-sustaining agent have a higher indentation for a given weight and volume, and equal indentation for less weight with the same volume. This is true regardless of the accelerator or other compounding ingredients employed and regardless of the specific gravity of the sponges.

EXAMPLE 2

Use of Gelling Agent with Oleic Acid

It may at times be desirable to use a gelling agent to set foam which contains oleic acid as a foam-sustaining agent especially in closed molds. The amount of gelling agent used is less than that required in the absence of oleic acid, generally only about one-fifth as much being satisfactory. By using oleic acid with such reduced amounts of gelling agent, the whipping time may be extended up to three or four times as long as in the prior art methods without fear of premature coagulation, thereby making the mix less critical. In such a procedure it is desirable to add the gelling agent to the foam after all of the other ingredients have been incorporated in it.

For example, a foamed mix of the same volume and composition as used in Example 1 was stirred at medium speed for five minutes and then at low speed for up to ten minutes and while so stirring there was added to rapidly gel the foam, a mixture of 20 grams of 50 per cent aqueous ammonium nitrate with 20 cc. of 28 per cent ammonia. The time of low speed stirring prior to adding the gelling agent may be reduced to five minutes or prolonged to two hours, the gelling agent then being added, and the stirring continued five or ten minutes after the gelling agent is added before pouring into the mold. This provides thorough mixing and gives ample time after addition of the gelling agent for pouring the foamed mix into the mold.

At room temperature the gelling time of this mix is slightly less than a similar mix containing oleic acid without the gelling agent, and at elevated temperatures it is materially less. The shrinkage will be a little greater than when no gelling agent is used and will be more with the addition of greater amounts of gelling agent. The size of the cells in the finished sponge and the cell-wall thickness will be less as gelling time before vulcanization is lessened. The indentation will vary with the cell size and cell wall thickness.

Although but three gelling agents have been mentioned in connection with the foregoing tests, other conventional gelling agents may be used with oleic acid (in amounts less than required to gel when employed alone) in producing the aforesaid advantages.

Incorporating Oil into Latex

The rubber particles in natural rubber latex are spherical, average one micron in size, are negatively charged, and are in constant motion (Brownian movement) in the continuous water phase of the latex. When a film of latex is deposited on any surface and the water present is reduced sufficiently by evaporation or the like, the rubber particles touch, the Brownian movement is arrested, and the rubber particles coalesce.

Different theories have been advanced to explain what occurs when a gelling or coagulating agent is incorporated in latex. It is generally believed that the electric charge is reversed. Whatever the cause, the rubber particles touch and become bonded together, squeezing out the water into the interstices between the rubber particles.

When oil is added to latex, as herein contemplated, the oil is dissolved into the rubber particles, and if sufficient oil is added to a latex of fifty per cent or preferably at least sixty per cent rubber content, the rubber particles swell until they touch and become bonded together causing the latex to become set. For example, adding one hundred per cent of oil (based on the weight of the rubber) to one hundred parts of rubber (as sixty per cent latex) using, for example, one and one-half per cent oleic acid (based on the weight of the oil) added to the oil or latex, the rubber particles swell until they double in volume. Such swelling does not affect the volume of the latex. The amount the particles must swell before touching depends upon the water content of the latex. If the rubber is to be cured, vulcanizing ingredients must be added to the latex, and they are customarily incorporated as a fifty per cent dispersion. This adds about five parts of water to the latex. The sixty per cent latex may be set up by the swelling of the rubber particles with the oil until they coalesce. There is no shrinkage of such a product until the rubber is dried, and even then the shrinkage is slight, of the order of several per cent.

The rate at which the rubber particles swell depends upon the temperature employed. Raising the temperature accelerates the swelling. When relatively small amounts of oil are used a gelling agent may be used to reduce the time required to set the latex.

To the best of my knowledge and belief the prior art formulae involving incorporation of unemulsified mineral oil into latex production of sponge, utilize no more than a minor portion of oil based on the weight of the rubber. The oil has not been used in sufficient amount to cheapen the sponge product materially. No one has known how to incorporate as much as twenty-five or fifty per cent or more of unemulsified mineral oil into latex nor has anyone known that oil can be used to cause latex to gel or set. It may be appreciated that inexpensive sponges may be made in this way.

Animal and vegetable oils may be incorporated into latex according to this invention, and may be used in sufficient amount to cause the rubber particles to swell until they touch and thereby produce mixes, etc. which set without the use of a gelling agent and are thus equivalent to petroleum oil.

Oils occurring in nature such as tea seed oil, corn oil, olive oil, cottonseed oil, lard oil, and other animal and vegetable oils may generally be incorporated into the latex in any desired percentage without adding oleic acid, probably because of the presence in the oil of free oleic acid. If the acid content of the oil is too high, a protective colloid is added to the latex to prevent too rapid gelling. Mineral oils are preferred to animal and vegetable oils not only because of their low cost, but also because they do not turn rancid and have a low freezing point.

As petroleum oils do not contain oleic acid it is necessary to incorporate this acid in such oil or the latex in order to incorporate any substantial amount of the oil into the latex. Otherwise the oil will separate into globules and the latex will be useless for the purposes herein proposed.

The oil used in several of the following examples was Sherwood Refining Company No. 27 White Oil and will be referred to herein as Sherwood white oil. It had the following specifications:

Specific gravity _____ .86
Firepoint _____ ° F__ 365
Freezing point _____ ° F__ −13
Distillation range _____ ° F__ 700
Saybolt viscosity at 100° F_____ 100
Saybolt color _____ 30
Paraffin base.

This is an ideal oil for use in carrying out this invention. The oils must be non-volatile at the temperatures at which they are to be used. Ordinarily, oils having little or no odor will be required. Requirements regarding color, viscosity, etc. will depend upon the use to which the sponge is to be put.

In the following formulae reference will be had to Masterbatch O which has the following formula:

*Masterbatch O*

600 gm. water at 180° F.
7.5 gm. Darvan #1 (alkyl naphthalene sulfonic acid sodium salt)
60 gm. Du Pont 552 Accelerator
240 gm. fine grain sulfur
300 gm. zinc oxide
60 gm. AgeRite Alba (hydroquinone monobunzyl ether)

EXAMPLE 3

Carpet Underlay No. 1

This formula is to be carried out with the ingredients, the room and the equipment at about 70° F. The latex used is that heretofore described as Latex No. 1.

Three ounces of twenty-six per cent ammonia and ten cc. of oleic acid are added to one hundred ounces of the latex. This is whipped to three and five-tenths gallons of foam by any suitable beater. A Hobart "A-200" was used in these examples. Then with slow agitation of the foam, sixty ounces of Sherwood White Oil containing twenty-three cc. of oleic acid are poured through a fine sieve into it, over a period of about one minute.

Slow agitation is continued for about five minutes until the oil has been thoroughly mixed into the latex. With continued slow agitation ten ounces of the ball-milled Masterbatch O are added and the mixing is continued about three minutes. The foam is spread on a thirty-six inch wide belt which is slowly moved under a doctor knife which produces a sheet of foam one-quarter inch thick. On drying this produces a sheet of foam having an area of about two square yards. The belt is run into a steam chamber at 212° F., atmospheric pressure, where it is cured for forty minutes. The sponge sheet is washed and dried, and is then ready for use as an underlay to be placed under carpets or rugs.

The foamed mix may be applied directly to the back of a carpet or rug instead of being spread on a belt. It will be cured in hot air so as to prevent damage the steam might do to the carpet or rug.

EXAMPLE 4

CARPET UNDERLAY No. 2

This is produced in exactly the same way as Underlay No. 1 except instead of sixty ounces of oil and twenty-three cc. of oleic acid, one hundred and twenty ounces is used with forty-six cc. of oleic acid. The finished underlay weighs about four pounds to the square yard and it has more body and greater cushioning effect than Underlay No. 1.

Alternatively, either of the sponge sheets of Examples 3 and 4 may be cured in hot air. Any curing conditions may be used compatible with the accelerator, etc. employed. The curing time may be shortened to a few minutes by curing in a high-frequency electronic field.

The cured sheet has the compressive deflection which gives excellent cushioning properties for an underlay for carpets, rugs, etc. Even when deflected to its substantial, compressible limit the additional body given to the rubber by the oil produces a very marked cushioning effect. The rubber underlay does not support moths or vermin of any kind, and even discourages them from attacking the carpet.

In all such operations it is advisable to foam the latex to the desired volume before incorporating the oil as it is difficult to form a foam of any great volume if the oil is mixed with the latex before foaming.

Up to several hundred per cent of oil may be used in such an operation and the cushioning effect, the shrinkage and tensile of the sponge will be in relation to the amount of oil used. The oil is non-oxidizing and has no adverse effect on the aging of the sponge. The indentation of the sponge does not change on aging for a long period of time.

When oil is incorporated in latex it swells the individual rubber particles and becomes an integral part thereof. Prolonged washing of the cured sponge in carbon tetrachloride removes only a small fraction of the oil. The cured sponge will not smear glass or stain the most absorbent paper or fabric even when more than one hundred parts of oil is added to one hundred parts of rubber (as latex). Five to five hundred or more parts by weight of petroleum oil per one hundred parts of rubber, may be used in such a product. Over five hundred parts of the oil may be incorporated, but the product is of poor quality, having too low tensile for carpet underlay.

Greater or lesser amounts of air may be incorporated in the foam to give a sponge of any desired weight and specific gravity, although it is quite difficult to make a very light-weight sponge containing any appreciable amount of oil.

Latex containing oil has many uses. It may be cast, spread, extruded, molded, etc. The latex may be given body by adding whiting, powdered flint, or the equivalent thereof to the oil in an amount up to several hundred per cent (based on the weight of the rubber), before incorporating the oil into the latex.

The following example illustrates the gelling of latex by oil without the addition of a gelling agent.

EXAMPLE 5

DOLLS

This example relates to the production of a doll, etc. and demonstrates that by the process of this invention it is possible to produce a sponge with substantially no shrinkage during either the gelling or curing.

Five hundred grams of Latex No. 1 was foamed by whipping until it occupied a volume of 1650 cc. A foam of small bubble size was obtained by slowly turning a beater through the foam of larger sized bubbles thus produced. Three hundred cubic centimeters of oil containing five cubic centimeters of oleic acid was beaten into the latex foam with slow agitation over a period of about two minutes. Then fifty grams of Masterbatch O were added, with slow agitation, over the next two or three minutes.

The foamed latex was poured into a doll mold containing an articulated skeleton with projections extending into the hand and foot portions of the mold. This skeleton was centrally anchored in the mold.

The mold should not be colder than the mix. It may be ten to twenty degrees warmer. The mold, skeleton and the foam may all be at the same temperature. This may be room temperature or thereabout. Immediately after filling, the mold was heated in steam at 212° F. at atmospheric pressure for one hour. After curing, the mold was opened and the sponge was washed and dried. No appreciable distortion of the rubber caused by shrinkage over the skeleton was discernible.

The surface of the doll was as smooth as the surface of the mold, and perfect in every detail. The sponge cells enlarged only slightly during the cure. The skin was smooth and felt quite like human flesh. It could be flexed and compressed, and the folds and wrinkles made by so doing were very life-like.

If the foam is allowed to stand in the mold at room temperature the swelling of the rubber particles will cause it to set to an irreversible gel in about twenty minutes. Heating hastens the setting of the gel, and the sooner the gel sets the smaller the air cells in the sponge. If the mold is subjected to cure immediately after filling, the cells enlarge very little. When heated for curing there is a slight increase in the volume of the mix, and the excess mix escapes through the vent holes provided in the mold. There is no shrinkage of the foamed latex or sponge in the mold thereafter and the surface of the sponge does not draw away from the surface of the mold.

If a gelling agent is added to the above mix it will ordinarily cause the foam to gel before the swelling action of the oil has been completed. On curing, the foam will shrink away from the mold surface and a large portion of the skin will be loose and separated from the body of the sponge. A protective colloid might be used to counteract the effect of the gelling agent, but then the one offsets the other and both are useless and undesirable.

The product has good tensile, almost as high as that of sponge which contains no oil. It has materially better elongation than a sponge of rubber unmixed with oil, and better body and indentation. Increasing the oil content of the rubber causes a drop in the tensile strength of the sponge proportionate to the amount of oil used.

As much as five hundred per cent of oil has been satisfactorily incorporated in latex of natural rubber in this manner for the production of sponge, such as human-like artificial breasts and other anatomical specimens. As little as ten per cent will cause the foam to set if the foam is heated, provided the mixing is prolonged to provide friction to aid in the coagulation.

At room temperature, natural-rubber latex of about sixty-two per cent rubber content to which has been added one hundred parts by weight of oil (containing two parts of oleic acid) per one hundred parts of the rubber and the curing agents, will gel in about twenty minutes. The use of only seventy-five parts of oil will prolong the gelling time to thirty or thirty-five minutes. With only fifty parts of oil, it will take one hour to gel. Two hours will be required if only twenty-five parts of oil are added. If only fifteen parts of oil are added to the latex it will take about twenty-four hours to gel. The gelling time also is dependent on the water content of the mix—the lower the water content the shorter the gelling time.

With a standardized latex, the behavior can be accurately predicted. Raising the temperature shortens the gelling time. At one hundred degrees F, if one hundred parts of oil are added to one hundred parts of natural-rubber latex, the latex mixture will gel almost instantaneously, and if twenty parts of oil are used it will take about twenty minutes to gel. At 70° F., if as much as five hundred parts of oil are added to natural-rubber latex, a little soap, casein, or other protective colloid is advantageously added to delay gelling until the foam can be poured. At 45° F., five hundred parts of oil can be added satisfactorily without using any casein or soap. In operating on a commercial scale with large bulks of the mix which require minutes to pour, the temperature of the room and materials is advantageously lowered to delay gelling.

*Comparison of water content of a foamed latex mix with unemulsified and emulsified oil*

The following table illustrates the effect of adding unemulsified oil to concentrated latex.

| Starting Latex | | Added Oil | Final Latex | |
|---|---|---|---|---|
| Rubber | Water | | Oil and Rubber | Water |
| Parts | Parts | Parts | Parts | Parts |
| 60 | 40 | 15 | 66 | 34 |
| 60 | 40 | 30 | 70 | 30 |
| 60 | 40 | 60 | 75 | 25 |
| 60 | 40 | 120 | 82 | 18 |

If the same amount of oil be added as a fifty-fifty oil-water emulsion, the water content of the final latex is much higher, as follows:

| Starting Latex | | Added Emulsion | | Final Latex | |
|---|---|---|---|---|---|
| Rubber | Water | Oil | Water | Oil and Rubber | Water |
| Parts | Parts | Parts | Parts | Parts | Parts |
| 60 | 40 | 15 | 15 | 58 | 42 |
| 60 | 40 | 30 | 30 | 56 | 44 |
| 60 | 40 | 60 | 60 | 55 | 45 |
| 60 | 40 | 120 | 120 | 53 | 47 |

The above shows that by adding unemulsified oil to a concentrated latex, the solids content of the latex is increased. If the oleic acid necessary to incorporate the oil in the latex is added to the latex, the latex will gel regardless of the amount of oil added, without adding any conventional gelling agent. If on the other hand the oleic acid is added to the oil, and only a small amount of oil is added to the latex so that the amount of oil or oleic acid present in the mixture is not sufficient to gel the mixture, conventional gelling agents may be used. When oil is used in latex in substantial quantities, and the water content of the latex is kept low, the swelling action of the oil on the rubber particles is largely responsible for the gelling action, and the purpose of adding the oleic acid is to effect solution of the oil into the rubber, rather than to utilize its gelling action. The addition of dry fillers (discussed in what immediately follows) decreases the percentage content of water in the latex mix and thus facilitates gelling. In mixtures containing a relatively large amount of oil and sufficient oleic acid to serve as a foam-sustaining and gelling agent, a slow speed mixer should be used to prevent premature gelation. It may be necessary also to minimize the mixing time in order to prevent premature gelation.

*Incorporating solid fillers in latex in dry state*

Solid fillers may be incorporated in latex and latex foam in the dry or non-aqueous state, and they may be dispersed in oil and the dispersion incorporated into latex and latex foam.

Powders such as whiting, flint, marble and slate, etc. when added to latex have no chemical interaction. When added in a dry state they are completely inert. They do not even absorb water and in this respect differ from such fillers as sawdust, wood flour and cork which remove water from the aqueous phase of the latex dispersion. The inert filler powders and their equivalents may be incorporated in a dry state directly into latex which contains the optimum amount of oleic acid, and this may be done without danger of coagulation. This latex dispersion may be stored for a considerable length of time; settling out of the powders will occur but they may be redispersed with stirring at the time of use. Flint and whiting powders have little effect on the foaming operation, and this latex-powder dispersion may be subsequently foamed and made into sponge. This dispersing feature is advantageous where a continuous foaming machine is used and the latex is metered into the machine.

Alternatively, the latex may be first foamed to the desired volume by any suitable means, and the dry inert powdered filler dispersed into the latex foam. This may be a batch operation. There is at times a slight reduction in the volume of the foam if the powders are poured in too rapidly; however, the foam may be again brought to the desired volume by a small amount of additional whipping. The curing agents may then be mixed into the foam and the mix cast or spread to make sponge rubber. Sponges four inches thick and thicker are readily obtainable.

The dry inert powdered filler may be first dispersed into an oil. The amount of oleic acid required to incorporate the oil into the latex may be added to this oil before or after dispersing the dry substances into it. This oil dispersion may be stored indefinitely but should be stirred at the time of use. The latex foam to which this dispersion is to be added should be brought to the desired volume first, and then the oil dispersion incorporated into it with slow stirring because it is difficult to produce a foam from the latex in which oil has been incorporated. In this oil dispersion method, the desired curing agents are not mixed into the foam until the oil dispersion has been thoroughly mixed into the latex foam. The mix is subsequently gelled and is then cured in any desired manner. It will be observed that the oil and filler reduce the percentage water content of the mix, proportionately to the amount used. They may be used in any desired proportions and in any desired amounts up to several hundred per cent on the rubber content of the latex. The powders may be of any size customary in the art. In the examples flint and whiting of three hundred mesh have been used satisfactorily.

Many powders that are produced from hard substances such as flint, whiting, quartz, slate, limestone, marble, etc. that absorb little or no moisture and that are substantially inert in latex, may be used. Such powders may be incorporated directly into latex or latex foam in their dry state as shown herein.

Other substances such as sawdust, wood flour, cork, zinc oxide, the various clays, etc. may be first dispersed in water and this dispersion incorporated with the latex or latex foam. They may, however, not be used in such high percentages as the aforementioned inert materials.

Some powders will coagulate latex unless a protective colloid is used in conjunction with them in latex. Such powders are generally to be avoided.

The additional water incident to the dispersions now commonly used for incorporating fillers into latex has disadvantages, and in materials such as the clays is to be avoided.

I prefer the inert powdered fillers. Any of these and some of the other substances such as sawdust, cork, etc. may be first dispersed in mineral oil and this oil dispersion incorporated into the latex or latex foam, without the use of a protective colloid.

Ground sponge rubber scrap may be advantageously incorporated into latex foam. The sponge should have a particle size about one-eighth inch and under, and before incorporating in latex should be soaked in water, and the surplus water removed by wringers or centrifuge. Otherwise this scrap rubber sponge will absorb too much moisture from the latex and cause a breakdown of the foam. I have successfuly mixed fifty parts by weight of ground sponge (on the weight of the rubber) in the latex.

As previously stated, oil produces a soft rubber compound. The insert powdered fillers produce a hard rubber. Various combinations of the oil and the filler will produce a rubber of almost any desired properties. The shrinkage of the rubber is reduced in proportion to the amount of (1) oil, (2) filler or (3) dispersion of the two which is used, based on the amount of the rubber.

The oil used in incorporating dry fillers in latex was Socony-Vacuum Industrial White Oil No. 205 which has substantially the same specifications as the aforementioned Sherwood White Oil, except its specific gravity is .85 instead of .86.

EXAMPLE 6

EFFECTS ON MECHANICAL STABILITY OF LATEX COMPOUNDED WITH INERT POWDERED FILLER IN DRY STATE

I will first show the difference between using oleic acid in the mix, and not using oleic acid in the mix. Then I will show the relative effects of gelling and curing methods, time and temperature on the product.

One hundred parts of flint (based on the weight of the rubber) was incorporated in the latex. This reduced the total water content of the latex from 38 per cent to 23 per cent. The original mechanical stability of the latex was 180 seconds. With the flint added, it was reduced to 75 seconds. On adding 3 drops of oleic acid to 50 grams of the latex and flint mix, the stability was increased to 230 seconds.

EXAMPLE 7

In this experiment the following masterbatches were used:

Masterbatch Q

| | Parts by weight |
|---|---|
| Water | 1,470 |
| Stablex B | 120 |
| Zenite | 450 |
| Sulfur | 420 |
| Zinc oxide | 540 |

The above ingredients were ball milled twenty-four hours.

Masterbatch R

| | Parts by weight |
|---|---|
| Water at 180° F | 3 |
| Stablex B | 0.60 |
| Du Pont Accelerator 552 | 1.50 |
| Du Pont Tetrone A | 1.50 |

The above ingredients were ball milled twenty-four hours.

In the examples referred to herein a mixture of 9½ parts of Masterbatch Q with ½ part of Masterbatch R was used. The two batches were made and stored separately and mixed just prior to incorporation in the latex. The curing time is materially reduced by this procedure over that required if the two masterbatches are mixed together any considerable time prior to use.

A Sunbeam Mixmaster was used on which No. 1 speed was 300 R. P. M. and No. 10 speed was 900 R. P. M. A 2500 cc. round bottom vessel was used. For spreading the underlay a hopper was used with the doctor blade set to produce a sponge one-quarter inch thick. The temperature of the room and all of the ingredients was 75° F.

Twenty-three grams of water was added to 323 grams of Latex No. 1. This makes a total of 346 grams of dispersion which contains 200 grams total solids. This 346 grams of dispersion was poured into the mixing bowl and stirred at No. 10 speed. Thirty-two drops of oleic acid were added and the foam was brought to a volume of 1900 cc. Two hundred grams of dry powdered flint was sprinkled into the foam over about one minute, while stirring on No. 1 speed. The foam was then brought to a volume of 2000 cc. by stirring for two minutes during which the foam was continuously stirred away from the sides of the vessel with a spatula.

Thirty-three grams of a fresh mixture of 9½ parts of Masterbatch Q and ½ part of Masterbatch R was added to the latex foam, and the mixing and stirring continued for another two minutes—all on No. 10 speed. The mix was then poured into the hopper and spread on a piece of six-ply rubberized belting, one-sixteenth inch thick. The belt was treated from time to time with a solution of ninety parts alcohol, ten parts oleic acid, and ten parts powdered mica, which when dried left a very thin film of oleic acid and mica on the belt. This facilitated the release of the underlay from the belt when cured in hot air.

The foamed mix on the belt was immediately heated in a circulating air oven at 285° F. A hard gel was obtained in three minutes; the heating was continued for a total of twenty minutes to cure.

The inert powdered fillers used were 300 mesh flint or whiting, and they may be used interchangeably without adjusting the procedure. Powdered marble and powdered slate have also been used. The marble is more expensive and the slate gives a dark color but otherwise they are satisfactory.

*Results.*—The structure of the sponge was excellent, with uniform small spherical cells. The indentation was excellent for the purpose of carpet underlay. The shrinkage was uniform and in the nature of three per cent.

The same mix was made and gelled, then transferred to open steam at 212° F. and cured 25 minutes. The structure was the same; the shrinkage was 7 per cent; the indentation slightly higher due to shrinkage.

The same mix was made, but allowed to gel at room temperature for 30 minutes; then cured 28 minutes in open steam. The shrinkage lengthwise was 7 per cent, but in thickness was 15 per cent.

The same mix was duplicated, only the mixing time after all ingredients were in was extended to ten minutes instead of two minutes. The gelling time was 1½ minutes compared to the three minutes above noted for gelling in air at 285° F. and the ten minutes required at room temperature. Cured in either air or steam, its other properties were respectively the same.

Sponges up to 4 inches thick and thicker can be made following this procedure.

EXAMPLE 8

CARPET UNDERLAY NO. 4

The foam including the flint was produced as in Example 7. The speed was then reduced to No. 1, i. e., 300 R. P. M. Two hundred grams of oil to which 3 cc. of oleic acid had been added, was then stirred into the foam over a period of two minutes; the curing agents were added to the foam and the mixing continued for two minutes. The foamed mix was poured into the hopper and spread.

Three such mixes were prepared. One was gelled and cured in hot air. Another was gelled in hot air and cured in steam. The third was gelled at room temperature and cured in steam. The hot-air gelling time was 1½ minutes. The sponge cured in hot air shrank 1 per cent, and that cured in steam shrank 3 per cent. The mix gelled at room temperature required ten minutes to gel, and on curing in steam shrank 10 per cent in thickness.

Note the reduction of gelling time due to the lower water content of the mix and the swelling action of the oil even with reduction of mixing time and speed.

*Results.*—The same relative cellular structure was obtained. The indentation of the air-cured product of Example 8 at 25 per cent deflection was substantially the same as that of Example 7, but at 75 per cent deflection was 40 per cent greater due to the increased body of the sponge.

Many other mixes were made with the same general procedure as that shown in Examples 7 and 8. Various proportions of oil to powders and various percentages of total oil and powders were used. Any proportion of inert powdered filler may be used in an oil dispersion up to an amount that makes the oil too thick to be conveniently dispersed in the latex or latex foam. When a high percentage of such inert filler (based on the amount of oil) is to be used it is better to disperse it directly in the latex, and then add the oil to the latex. Up to several hundred per cent of either or both the inert filler and oil (based on the weight of rubber) can be incorporated in natural rubber latex. A desired gelling time is obtained by adjusting the mixing time and speed.

Where relatively small amounts of the oil and inert powders are used in a foam mix, a small amount of gelling agent may be used to reduce the mixing time to produce a faster gel without serious effects. The amount of gelling agent required will not be as great as required when no oil is used.

Where the temperature of the operation is much greater than 75° C. it is sometimes convenient to add protective colloids to the foamed mix to prevent too rapid gellation, particularly where heavy compounding is employed. Casein or soaps may be used, but the product is inferior to that obtained where only oleic acid is employed.

EXAMPLE 9

To substantiate the value of the use of oleic acid in latex mixes, I conducted experiments similar to those described as Examples 7 and 8, but omitting the oleic acid.

In Example 7, the latex without the oleic acid would produce a volume of foam of only 1400 cc. instead of 2000 cc., in the same whipping time. This was the maximum volume this latex would reach, regardless of how long it was whipped. I then incorporated 200 grams of whiting in the foam and on continued whipping the volume increased to 1500 cc. The curing agents were added and the mixing continued for 10 minutes on No. 10 speed. The mix was placed in the hopper and spread. The gelling time in hot air was 6 minutes instead of three.

Gelling cold required 40 minutes instead of twenty. The curing times were the same. While the overall properties were good and usable, the density was much heavier.

The structure was not as good as that obtained in Example 7, and the shrinkage in thickness in the cold gel was 20 per cent.

I attempted to incorporate in the foamed latex of Example 9 various amounts of oil over 15 per cent with no oleic acid in the oil. The oil would not mix with the rubber, and the results were a complete failure.

In separate batches of a mix containing no oleic acid, prepared as in Example 9, I incorporated 200 grams of teaseed oil, olive oil, cottonseed oil, and other oils, respectively, and a satisfactory sponge was made from each.

In the mix of Example 7 I substituted for oleic acid various soaps, namely, potassium oleate, tincture of green soap, potassium castor oil soap, etc. No oil was used. With each of these I could reach the 2000 cc. volume of foam. 100 parts of flint per 100 parts of rubber were then added as before, the curing agents added, and the mixing continued ten minutes on No. 10 speed. The hot-air gelling time was 10 minutes instead of the 1½ minutes required in Example 7, and room-temperature gelling time was 50 minutes instead of 10 minutes. The curing time was the same in both air and steam.

Results.—The structure of each sponge containing soap was poor; the cells were not spherical nor uniform, but were quite disconnected or frothy. The indentation value for sponge of the same specific gravity was one-third to one-half that where oleic acid was used in the mix.

Petroleum oil will not go into the mix without oleic acid, yet when oil and oleic acid were used in the soap mixes the processing operations and the gelling times were satisfactory and useful pieces of sponge were made, although such procedure is quite inferior to the preferred methods described herein.

In additional examples of the above soap mixes where no oil was used to set the mix, and a gelling agent was used with very slow and short stirring, a satisfactory sponge was made, yet the procedure is still quite inferior to the preferred method and the mixing is too critical for large-scale production.

EXAMPLE 10

Fine sawdust and wood flour from non-acid woods were incorporated directly into latex which had been foamed in the presence of oleic acid, without breakdown of the foam, with slow stirring. Curing agents were added, and a sponge produced. Only amounts up to 50 per cent of the weight of the rubber can be used practically. It is better to first disperse these substances in oil and then incorporate the oil dispersion into the foam. With this procedure a satisfactory sponge for carpet underlay may be produced. The procedure is substantially the same as in Examples 7 and 8. The slower speeds should be employed.

Various cellulose and other flocks may be incorporated in foamed latex in the form of oil dispersions.

By using the dry compounds dispersed in oil instead of as the usual water dispersions or emulsions, the water content of the foam is decreased, and this has various advantages as shown herein.

In making carpet underlay in the form of large sheets, according to any of the formulae shown herein, it is often desirable to spread the mix onto thin, strong, open netting to which it becomes bonded, in order to add strength to the underlay and facilitate its handling. For example, if foamed latex mix such as described in Example 7 is spread from the hopper onto netting to produce a sheet in the neighborhood of one-quarter inch thick, a satisfactory underlay is obtained. The netting is made of any cheap cloth fibers such as burlap, etc., and may be one-quarter inch mesh, more or less.

Carpet underlay is subjected at times to substantially its entire compressive limit whereas mattresses, cushions, etc. are subjected to only partial compression in use. Carpet underlay should have sufficient body to still produce a cushioning effect when compressed to substantially its compressible limit. It is normally about ¼ inch thick. In accelerated wear tests it has been found that soft carpet underlay which has considerable body, such as that produced according to this invention gives carpets and rugs a longer life than that produced from ordinary foamed-latex sponge.

EXAMPLE 11

USE OF OLEIC ACID IN DEAMMONIATED LATEX

It is quite obvious that ammounium oleate may be used in place of oleic acid in carrying out the invention. However, the only value in the ammonium oleate is the oleic acid it contains. Ammonium oleate is an ointment-like mass formed from $NH_3$ (5.69%) and oleic acid (94.31%). It is much more difficult to disperse into latex and the oil than oleic acid. To substantiate the statement that the only value it possesses is in its oleic acid content, 1 have made numerous tests with both ammoniated and deammoniated latex in connection with oleic acid and ammonium oleate.

In this connection I have discovered a simple and positive method of removing ammonia from latex without substantially changing its mechanical stability. This involves heating the latex in an atmosphere of steam to drive off the ammonia while preventing the vaporization of water. The use of pressure need not be used.

In my experiments the latex was placed in a closed vessel having a very small vent in the top and subjected to treatment in a steam chamber at various steam pressures and times. I have found that natural latices such as those referred to herein may be deammoniated in this way by heating in an atmosphere of steam at 212° F. for a period of two hours. Heating 25 minutes at 20 pounds pressure accomplishes the same result. The atmosphere of steam prevents the water from evaporating from the latex, and a dried film from forming on the surface of the latex which would occur if dry air were used. The ammonia escapes into the steam.

In some operations, such as producing foam under pressure, as in continuous foam-mixing machines, it is necessary to use latex of low ammonia content, and the above process may be used to reduce the normal ammonia content of the latex rather than to completely deammoniate same. It is quite obvious that a shorter length of heating in the atmosphere of steam will bring the ammonia content of the latex to the optimum for any particular operation.

For comparison with the deammoniated latex I used a centrifuged latex which was substantially nine months old. This is referred to herein as Latex A. Certain pertinent information with regard to this latex follows:

Total solids _____ 62%.
Ammonia content on percentage of water ____ 1.3.
Viscosity at 60% t. s. c. (total solids content) at 77° F _____ 50 cps.
Surface tension at 40% 95° F _____ 35 dynes.
pH _____ 10.
Mechanical stability at 75° F _____ 150 seconds.
KOH _____ 8.

After deammoniating a part of this latex by heating to 212° F. for two hours as described, a product was obtained to which a small amount of water was added to restore it to its original total solids content. This is referred to herein as Latex B. It had the following properties:

Mechanical stability at 75° F _____ 150 seconds.
pH _____ 8.

Latex B was allowed to cool while maintained at 75° F. for twenty-four hours before testing.

In order to prove the value of oleic acid in latex and to prove that the only value of ammonium oleate in ammoniated latex is the oleic acid it contains, various experiments were carried out with Latex A and Latex B. I wish to refer first to experiments conducted on such latices which contained no curing agents, and then I wish to refer to experiments conducted on the same latices to which curing agents were added after foaming.

A Sunbeam Mixmaster was used in the tests. No. 1 speed was 300 r. p. m. and No. 10 speed 900 r. p. m. A 2500 cc. vessel was used in the tests. The room temperature was 75° F.

Three hundred twenty-three grams of Latex A which contained 200 total solids when stirred on No. 10 speed produced 1500 cc. of foam in 3 minutes. This is the maximum quantity of foam this speed will produce even if the mixing were continued longer.

Three hundred twenty-three grams of Latex A with 32 drops of oleic acid added will produce 2000 cc. of foam in the same length of time under the same treatment.

Three hundred twenty-three grams of Latex B produces a maximum volume of only 1000 cc. of foam when mixed on No. 10 speed. With 32 drops of oleic acid added this Latex B produces a volume of 2000 cc. of foam in 3 minutes.

The above shows that the addition of oleic acid to both ammoniated latex and deammoniated latex increases their foaming properties.

A satisfactory foamed-latex sponge is produced with Latex A regardless of whether or not oleic acid is added as above described. Twenty-three grams of a fresh mixture of 9½ parts Masterbatch Q and ½ part Masterbatch R was added to each of the foams above described, and the whipping continued for ten minutes at No. 10 speed. It is immaterial whether this mix be gelled in radio frequency or hot air, or whether it be cured in radio frequency, hot air or steam. On the contrary, a good sponge is obtainable from Latex B only if oleic acid is added. If no oleic acid is added and the latex is foamed and a fresh mixture of masterbatches is added, the mix will not gel but breaks down into a liquid and it is impossible to produce a sponge. If 32 drops of oleic acid is added to 323 cc. of Latex B, as above described, and the masterbatch mixture is added to this, and the whipping continued for ten minutes on No. 10 speed, this mix may be gelled in radio frequency or hot air, and may be cured in radio frequency, hot air or steam the same as Latex A.

Apparently the presence of ammonia in latex affects its gelling properties.

Latex A with oleic acid produces a very superior piece of sponge. Latex A without oleic acid produces a piece of sponge that is inferior to that produced when oleic acid is used. When no oleic acid is used the process is very critical, the gelling time is much longer than when oleic acid is used, and the density is much higher. With Latex B and oleic acid the gelling time is still longer and the sponge so produced is inferior to either of the foamed rubbers produced with Latex A.

These tests however prove that a sponge can be produced with a latex containing no ammonia and no gelling agent such as ammonium nitrate, ammonium sulfate, sodium silicofluoride, etc., mixing on No. 1 speed for three minutes (instead of ten minutes as in the previous tests), a satisfactory gel was obtained and a piece of foamed rubber sponge was produced in all cases. Where no oleic acid was used more gelling agent was required to produce a satisfactory gel.

In other tests the ammonia in Latex A was neutralized with formalin. The end product was inferior to any of the sponges produced by the other tests.

Similar tests were conducted with a creamed latex having substantially the same properties, and substantially the same results were obtained.

The foregoing tests show that it is not necessary to use oleic acid to obtain the results described herein. Ammonium oleate, for example, may be used in its stead and other oleates which produce an equivalent result may be employed.

In every instance where the optimum amount of ammonium oleate or oleic acid is used in a latex sponge formula where a foaming agent was also used or where a gelling agent was used, or both, the cellular structure was improved and the processing operation was made less critical.

EXAMPLE 12

TEMPORARILY DESENSITIZING GELLING AGENTS

In the production of foam from a latex in which the operation is critical, whether or not the latex contains added oleic acid or conventional foaming agents, as for example in the production of sponge of low specific gravity, the incorporation of a gelling agent into the mix tends to break the foam down in the mixing chamber before a complete dispersion of the gelling agent is obtained. This is true whether or not oleic acid is present, and the remedy which follows is the same whether or not oleic acid is present.

I have discovered that if ammonium hydroxide is added to the gelling agent before mixing it with the foamed mix, this tendency to break down is substantially eliminated. This procedure enables one to continue the mixing operation long enough after addition of the gelling agent to obtain a thorough dispersion of the gelling agent in the mix. For any gelling agent, for instance an aqueous dispersion of ammonium nitrate, ammonium sulfate or sodium silicofluoride, generally one volume of ammonium hydroxide to one volume of a 50 per cent dispersion of liquid gelling agent is sufficient. This is illustrated in Example 2. This ratio may be varied and as little as one volume of ammonium hydroxide may be satisfactory. There is little appreciable change in the ultimate gelling time of the completed mix and no undesired effect on the end points of the product.

A protective colloid also may be used for this purpose instead of ammonium hydroxide, but this slows down the ultimate gelling time so that more gelling agent must be used to get the same results.

Whether ammonium hydroxide or a protective colloid is used, a much greater amount of the protective agent would have to be used if it were to be incorporated with the latex instead of the gelling agent.

Throughout the examples where reference is made to the use of an oil, an oil such as the Sherwood white oil more specifically described herein may be used. Other oils may be employed, and latices of other rubbers than natural rubber may be used provided the oil is soluble in the rubber. Mixtures of natural rubber latex and synthetic latex may be used such as mixtures containing the two in proportions of 90:10, 80:20, 70:30, 60:40, 50:50, etc. I have tried to use other acids than oleic acid, such as stearic acid, linoleic acid, etc. but the results were not as satisfactory. Instead of using the accelerators and other ingredients mentioned for compounding with the latex, other accelerators, etc. may be employed as is well known in the art because there is nothing unusual about the vulcanization process. In the production of sponges of low specific gravity where tensile strength is not a factor, as in the manufacture of pillows, it may be desirable to add a soap to produce a low modulus; even in such formulations using a soap, and even also a usual gelling agent, the use of oleic acid will improve the cellular structure of the sponge and materially assist in sustaining the foam during gelling and curing.

I wish here to disclose subject matter which supplements the disclosure in my application Serial No. 85,521 filed April 5, 1949, of which this application is a continuation-in-part. In that application I have disclosed the swelling of sponge rubber by dissolving an oil into it. The following disclosure is not limited to what is here said but is broad as though it were added to the disclosure of that portion of the prior application which relates to swelling with oils, and incorporates the broadening features of that earlier application.

The earlier application discloses that a rubber sponge— whether foamed-latex sponge or a chemical sponge—may be uniformly swollen by dissolving an oil into it. Fig. 1 of that application illustrates a vessel which may, for example, be 18 inches square. The sponge to be treated is one foot square. This allows ample room for the sponge to swell laterally as it takes up the oil. An inch off of the bottom of the vessel is a perforated screen on which the sponge rests. In the experiment which I am about to describe the screen was located one-eighth inch above the floor of the vessel. The vessel is equipped with a plunger, the head of which is perforated. Any suitable means is provided for reciprocating the plunger head in the vessel.

In using this equipment sufficient oil-water emulsion is employed to cover the sponge in its uncompressed air-free condition. The plunger is lowered into the vessel to compress the sponge and drive all air out from it. On lifting the plunger head the emulsion is absorbed by the sponge and the oil is incorporated uniformly throughout the sponge. In order to get uniform solution of the oil into the sponge the plunger will be lowered and raised several times in the course of a minute or two, depending upon the thickness of the sponge. This causes uniform distribution of the oil globules of the emulsion throughout the sponge, with resultant uniform solution of the oil from the emulsion into the walls of the cells.

On solution of all of the oil into the sponge, the water remains in the sponge, and after standing a few minutes or so (or whatever time is required for all of the oil to dissolve into the sponge) the water may be expelled by compressing or centrifuging the sponge. The sponge may be washed if desired, but this is not necessary. The total amount of oil in the emulsion does not exceed that which is dissolved into the sponge, so there is no undissolved oil left on the surface of the sponge to give it an oily feel.

That prior application discloses that the first 25 per cent of oil (based on the weight of the rubber) dissolved into the sponge increases the indentation 25 per cent. When an additional 25 per cent of oil has been dissolved into the sponge, making a total of 50 per cent, the indentation is returned to substantially that of the sponge in which no oil has been dissolved. It continues to decrease with the addition of more oil.

I have conducted certain experiments to determine the effect on indentation values of incorporating both an inert filler and an oil into the sponge. Although the following examples refer more particularly to the use of flint, I may use alternatively, whiting, quartz, slate, limestone, marble, etc.

A series of experiments has been conducted on pieces of sponge measuring 12"x12"x4" thick. The samples identified herein as samples A contained no flint. Twenty-five per cent, fifty per cent and one hundred per cent of flint were added to samples identified herein as samples B, C, and D respectively. The flint was incorporated by addition to the foamed sponge as disclosed in Example 8 hereof. A mixture of 9½ parts of Masterbatch Q with ½ part of Masterbatch R was used. The two masterbatches were made and stored separately and mixed just prior to incorporation in the latex. I used a Reed mixer with a twenty-gallon mixing bowl in the bottom of which are air discs through which the air is bubbled in producing a foam. The latex used was Latex No. 1, hereinbefore described. Substantially eleven gallons of foam was made at a mixing and this was sufficient to make four cushions of the size mentioned, with a small excess.

Thirteen pounds of the latex was placed in the bowl and to this was added 0.6 pound distilled water. The air was turned on through the discs in the bottom of the bowl at one-quarter pound pressure and the beater started at slow speed. Then 16 cc. of oleic acid was added and the foam was brought to a volume of eleven gallons. The air was then turned off. There was then added 1.17 pounds of Masterbatch Q and 0.13 pound of Masterbatch R. This procedure was followed in making each series of samples, except that in series B, C, and D the flint was added before the masterbatches, and slow stirring was continued during this addition and afterward, but the length of time the batch was stirred after the addition of the masterbatches varied for each series, as will be explained.

In making the A samples, stirring was continued for 15 minutes. The four samples were poured, and excess foam was scraped from the tops of the forms by a straight edge. The samples of foam were placed in an air oven with air circulating at 150° F. They were kept here for 15 minutes to gel. They were then cured in open steam. The control sample of each series, i. e., the sample which was not to be swelled, was cured for 40 minutes to obtain the optimum cure. The other three samples of each series which were to be swelled, were cured only 37 minutes. The sponges were then washed and dried for testing.

In making the B samples, when the foam reached a volume of ten gallons, 2.2 pounds of dry powdered flint (about 300 mesh) was incorporated in the foam. The foam fell slightly but was brought to the desired volume by slight additional stirring with the air on. The air was then turned off and the mentioned amount of each of the two masterbatches was added. The mixing was continued for 13 minutes. The mix was poured into four molds as before, gelled for 13 minutes and the samples vulcanized in open steam.

In making the C samples, 4.4 pounds of flint was used. The mixing time after the addition of the masterbatches was reduced to 10 minutes. The gelling time was reduced to 10 minutes. The curing times were the same as before.

In making samples D, 8.8 pounds of flint was used. The mixing time, after addition of the masterbatches was reduced to 7.5 minutes, and the gelling time was reduced to 7.5 minutes. The same curing procedures were used.

The mixing time in any or all of the examples might have been prolonged up to thirty minutes, for example. This would have reduced the time required for gelling.

Samples A which contained no flint weighed two pounds each. Samples B which contained 25 per cent flint (based on the weight of the rubber) weighed two and one-half pounds. The samples C which contained 50 per cent flint (based on the weight of the rubber) weighed three pounds each. Samples D contained 100 per cent flint (based on the weight of the rubber) and weighed four pounds each. One of each of the samples A, B, C, and D was fully cured as a control. Three samples each of A, B, C, and D were undercured, as described, and these were each swelled with oil in the apparatus described.

For swelling, an oil-water emulsion was employed. The oil used was the Sherwood White Oil referred to herein. In making these emulsions two per cent of oleic acid and 0.2 per cent triethanolamine was used on the oil, and the mixtures of oil and water were stirred rapidly to form the emulsion. Other suitable emulsifying agents may be used. The exact amounts of emulsion to contain the desired amount of oil for each swelling operation was placed in the vessel.

Twenty-five per cent of oil was incorporated in one of the undercured samples A, B, C, and D respectively. Fifty per cent of oil was incorporated in another of each of these samples, and in the last of the samples 95 per cent of oil was incorporated. For swelling twenty-five and fifty per cent, an emulsion of 25 parts of oil and 75 parts of water was used. For swelling ninety-five per cent, a 50:50 emulsion was employed. Only a few minutes was required to absorb all of the oil in each of the sponges. Only 95 per cent of oil was incorporated instead of 100 per cent to be sure the sponge would not have an oily feeling and would be incapable of smearing glass, linen or any other material with which it came in contact. The indentation value of each of these cured sponges was then determined. The samples swelled with 50 percent of oil had substantially the same indentation value as the unswelled samples. The other indentation values, measured in pounds per square inch, are given in the following table:

|  | Sample A | Sample B | Sample C | Sample D |
|---|---|---|---|---|
| No oil | .30 | .43 | .59 | 1.27 |
| 25 percent oil | .38 | .54 | .74 | 1.62 |
| 95 percent oil | .16 | .21 | .27 | .67 |

Thus, the indentation values increase during the incorporation of the first 25 per cent of oil, and thereafter they decrease.

One may add 10 per cent, 20 per cent, 30 per cent, 40 per cent, 60 per cent, 70 per cent, 80 per cent, 90 per cent, or any desired amount of oil (based on the weight of the rubber) to a sponge which contains any percentage of inert matter, or mixture of inert matters, such as the flint, whiting, etc. heretofore mentioned, or their equivalent, as for example 25, 50, 75, 100 per cent or more (based on the weight of the rubber). Although the examples refer to incorporating only 100 per cent of inert matter it is possible to add more than this and I have produced samples containing several hundred per cent of inert matter. Likewise it is possible to incorporate more than 100 per cent of oil into the sponge, and I have incorporated up to 500 per cent of oil into a sponge, although such sponges are not recommended for mattresses and the like. Thus, sponges may be made which contain up to 100 per cent or in excess of 100 per cent of inert matter and up to 100 per cent or in excess of 100 per cent of oil (based on the weight of the rubber). Part of the oil may be incorporated with the latex before or during foaming, and the balance dissolved into the sponge.

Both the oil and the inert matter are cheaper than rubber in the present market and will probably always be cheaper than rubber. Thus it is not only possible to obtain a sponge having any desired indentation value, but such a sponge may be made more cheaply by the method herein described than by forming it entirely of rubber.

I claim the use of oil and inert matter as herein described as a part of my invention.

What I claim is:

The method of making a resilient cellular rubber product which comprises the steps of foaming together a mixture consisting of rubber latex containing at least 50% of rubber and from 0.1% to 1.5% based on the weight of the rubber of a compound selected from the group consisting of oleic acid and ammonium oleate, adding to the foam vulcanizing agents and at least 25% of inert filler based on the weight of the rubber, and vulcanizing said foam.

References Cited in the file of this patent

UNITED STATES PATENTS

| Number | Name | Date |
|---|---|---|
| 1,852,447 | Chapman et al. | Apr. 5, 1932 |
| 1,862,061 | Newton | June 7, 1932 |
| 1,995,319 | Murphy et al. | Mar. 26, 1935 |
| 2,138,081 | Wolf | Nov. 29, 1938 |
| 2,140,026 | Murphy et al. | Dec. 13, 1938 |
| 2,147,680 | Stevens | Feb. 21, 1939 |
| 2,226,517 | Binns | Dec. 24, 1940 |
| 2,261,439 | Kelly | Nov. 4, 1941 |
| 2,288,686 | Daniels | July 7, 1942 |
| 2,290,729 | Blair et al. | July 21, 1942 |
| 2,304,717 | Swart | Dec. 8, 1942 |
| 2,358,204 | Bird | Sept. 12, 1944 |
| 2,426,430 | Binns | Aug. 26, 1947 |
| 2,512,475 | Bau | June 20, 1950 |

FOREIGN PATENTS

| Number | Country | Date |
|---|---|---|
| 420,163 | Great Britain | Nov. 26, 1934 |